Oct. 1, 1957  W. E. O'SHEI  2,808,300
OSCILLATING PISTONS FOR FLUID PRESSURE MOTORS
Filed Oct. 17, 1955

INVENTOR
William E. O'Shei
BY
Holcomb, Wetherill & Brisebois
ATTORNEYS

United States Patent Office 2,808,300
Patented Oct. 1, 1957

2,808,300

OSCILLATING PISTONS FOR FLUID PRESSURE MOTORS

William Edward O'Shei, London, England

Application October 17, 1955, Serial No. 540,906

Claims priority, application Great Britain October 18, 1954

9 Claims. (Cl. 309—22)

The specification of my prior United States patent Serial No. 2,612,875 issued, October 7, 1952, describes fluid pressure motors of the oscillating paddle type in which the packing members are made of rubber-like material, preferably being cut from sheet material or synthetic rubber. Various advantages are obtained with such constructions as explained in that specification.

In order to obtain the most efficient sealing, it is important that the rubber-like packing members should be firmly clamped between the outer plates and the central spacing means in such manner that the clamping will prevent the marginal flange of the packing from being forced back into the space between an outer plate and the central spacer whilst not being so tight that the rubber-like material will be so compressed that it will swell out from therebetween and thus increase the width of the marginal flange. In mass production, difficulty is experienced in achieving this optimum clamping pressure. Difficulty particularly arises in the region where the paddle shaft extends between the packing members for at this region which is notoriously difficult to seal by reason of the marginal flange having to be trimmed to clear the shaft, any movement of the rubber flange back into the space between an outer plate and the central spacer is almost certain to produce leakage. On the other hand, if the clamping pressure at this region is too great, the sheet rubber material between the outer plates and the central spacer will be so compressed that the adjacent parts of the flange will swell out and are likely not to fit properly around the shaft, so that leakage is again likely to be produced.

The present invention has for its object to provide a construction which is applicable to mass production methods and avoids these difficulties.

To this end, according to the invention, the outer plates and/or the central spacer are provided adjacent their edges, at least in the region of the shaft, with projections which interengage with the rubber-like material of the packing members clamped therebetween and resist any movement of the material of the packing members between an outer plate and the central spacer where the projections are provided. In this way, the clamping pressure is not so critical and it is an easy matter to control the process of assembly so that the clamping pressure, in conjunction with the action of the projections, will prevent relative movement of the packing members between the outer plates and central spacer, whilst the clamping pressure can be sufficiently low to avoid any possibility of so compressing the packing material as to cause it to swell out from between an outer plate and the central spacer.

Conveniently the projections may be formed on the central spacer whilst the outer plates are formed with correspondingly positioned apertures or recesses so that, when the outer plates are assembled to the central spacer with the packing members therebetween, the projections will indent the material of the packing members and force it to extend slightly into the corresponding apertures or recesses. Alternatively the outer plates may be formed with projections in which case, if desired, correspondingly positioned recesses may be provided in the central spacer.

In order that the invention may be more clearly understood, an embodiment thereof will now be described with reference to the accompanying drawings, in which.

Figure 1:
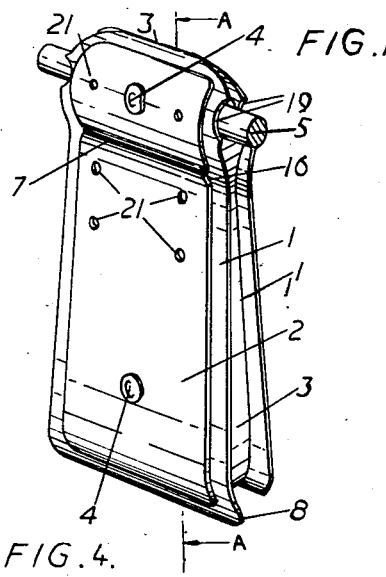
Figure 1 shows a perspective view of the complete paddle assembly.

Referring to the drawings, the paddle shown is constructed generally as described in the aforementioned specification and consists of two packing members 1, 1' of sheet polyvinyl chloride or other rubber-like material which are clamped between the outer plates 2, 2' and a central spacer member 3, the whole assembly being secured together by rivets 4. The paddle shaft 5 extends from opposite sides of the central spacer member 3 which is preferably constructed as a die-casting as described in the aforementioned specification.

The packing members are made larger than the cross-section of the paddle chamber 6 of the motor by an amount approximately equal to the width of the flanges to be formed around each packing member, and the outer metal plates 2, 2' of the paddle assembly are made of such a size that they will clear the inner walls of the paddle chamber 6 by an amount less than the thickness of the sheet material from which the packing members 1, 1' are made. The marginal flanges of the packing members are trimmed at 19 to fit around the shaft 5 when they are folded over after insertion of the paddle within the paddle chamber. The plates 2, 2' are preferably formed inwardly at 7, the central spacer member 3 being similarly shaped, so that the thickness of the paddle unit can be made as small as possible to permit the maximum arc of swing to be obtained. If desired, the plates 2, 2' may also be provided with small notches 16 in their peripheries in order to clear the curved corners of the auxiliary arcuate chamber 14 and thus still further increase the maximum arc of swing.

Figure 3:
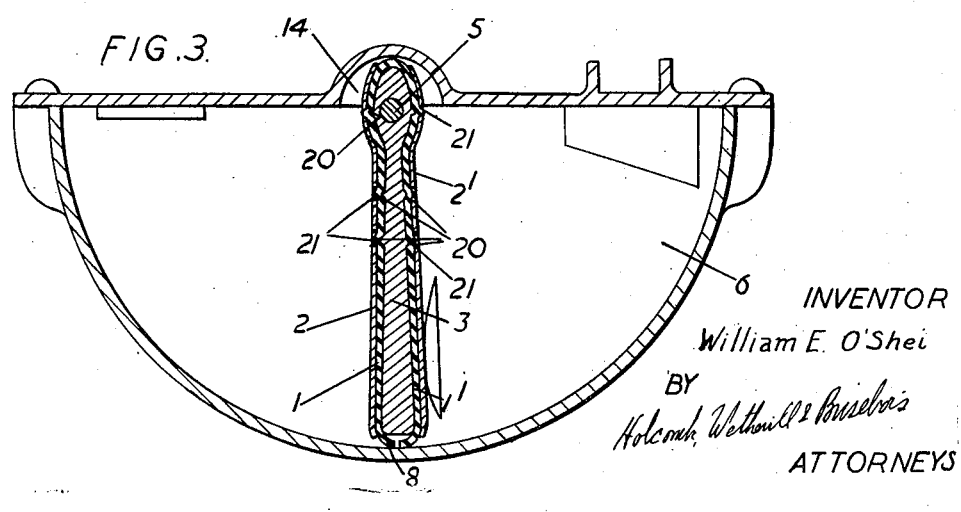
Figure 3 is a section through the housing of a suction motor with the paddle in position, the sectioning of the paddle being taken along the line A—A in Figure 1.

The top and bottom ends of the outer plates 2 and 2' are also bent inwardly in order to cause the top and bottom ends of the packing members to be inclined slightly inwards as shown, for example, by 8 in Figure 3. Preferably, however, the top ends of the two packing members are joined together in the manner described in the aformentioned specification. This may be most easily effected by cutting the two packing members as an integral unit from the sheet material, the two members being joined at 9.

According to this invention, the central spacer 3 is provided with small projections 20 adjacent its edge and in the region of the shaft 5 and the outer plates 2, 2' are formed with correspondingly positioned apertures 21 of slightly larger diameter than the projections 20. When the packing members are made from sheet material which is about 0.025" thick, the projections 20 may be about 0.015" high and the apertures 21 may be about 0.020" larger in diameter than the diameter of the projections. If the central spacer 3 is made of a die-casting, the projections 20 may be formed integrally with the casting. Generally, the clearance between the sides of the projections and the sides of the corresponding apertures should be less than the thickness of the material of the packing members.

When the outer plates are assembled to the central spacer with the packing members therebetween, the projections 20 force the material of the packing members to extend slightly into the apertures 21 and thereby prevent relative movement between the packing members and the outer plates and the central spacer in the region where the projections and apertures are provided.

Figure 4:
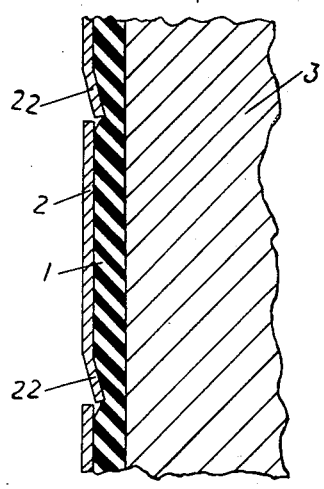
Figure 4 is an enlarged fragmentary section of part of the paddle assembly showing a modified construction.
Figure 2:
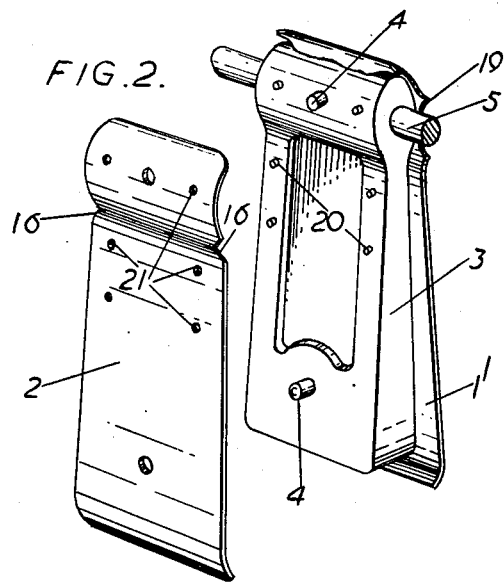
Figure 2 shows an exploded perspective view of an outer plate and the central spacer.

Whilst a particular embodiment has been described, it will be understood that various modifications may be made without departing from the scope of the invention. For example, as shown in Figure 4, the projections may be constituted by tongues 22 struck out from the material of the outer plates 2 and projecting into the material of the packing members.

The central spacer need not be constituted by a single unitary member but can be built up, in known manner, from formed sheet metal members.

I claim:

1. In or for a differential fluid pressure motor of the oscillating paddle type, a paddle member comprising a central spacer member, a shaft carried by said central spacer member, a packing member of rubber-like material arranged on either side of said central spacer member, an outer plate secured over the outer surface of each packing member and clamping said packing member on to the central spacer member, and projections formed on at least one of said central spacer member and said outer plates at least in the region of the shaft, said projections extending in a direction away from the surface of said spacer member or outer plates and so as to interengage with the rubber-like material of the packing members to resist any movement of the material of the packing members between an outer plate and the central spacer member in the region where the projections are provided.

2. In or for a differential fluid pressure motor of the oscillating paddle type, a paddle member comprising a central spacer member, a shaft carried by said spacer member, a plurality of projections formed on either side of said spacer member at least in the region of the shaft and extending in a direction substantially normal to the surface of the spacer member, a packing member of rubber-like material arranged on each side of the spacer member, an outer plate positioned over each rubber-like packing member, and means for securing said outer plates in position to hold the packing members clamped between the spacer member and the outer plates with the projections of said spacer member pressed into the surface of said packing members.

3. A device as claimed in claim 2, in which the projections are formed integrally with the central spacer.

4. A device as claimed in claim 2, in which the central spacer comprises a die-casting and the projections are formed integrally as part of the die-casting.

5. In or for a differential fluid pressure motor of the oscillating paddle type, a paddle member comprising a central spacer member, a shaft carried by said spacer member, a plurality of projections formed on either side of said spacer member and extending in a direction substantially normal to the surface of the spacer member, a packing member of rubber-like mtaterial arranged on each side of the spacer member, an outer plate positioned over each rubber-like packing member, each of said outer plates being formed with a plurality of apertures corresponding in position to the projections on said central spacer member, and means for securing said outer plates in position to hold the packing members clamped between the spacer member and the outer plates with the projections on said spacer member pressed into the surface of said packing members so as to indent the material of said packing members and force it to extend slightly into the corresponding apertures.

6. A device as claimed in claimed 5, in which the clearance between the sides of each projection and its corresponding aperture is less than the thickness of the material of the packing members.

7. In or for a differential fluid pressure motor of the oscillating paddle type, a paddle member comprising a central spacer member, a shaft carried by said spacer member, a plurality of projections formed on either side of said spacer member and extending in a direction substantially normal to the spacer member, a packing member of rubber-like mtaterial arranged on each side of the spacer member, an outer plate positioned over each rubber-like packing member, each of said outer plates being formed with a plurality of recesses corresponding in position to the projections on said central spacer member, and means for securing said outer plates in position to hold the packing members clamped between the spacer member and the outer plates with the projections on said spacer member pressed into the surface of said packing members so as to indent the material of said packing members and force it to extend slightly into the corresponding recesses.

8. In or for a differential fluid pressure motor of the oscillating paddle type, a paddle member comprising a central spacer member, a shaft mounted on said central spacer member, a packing member of rubber-like material arranged on either side of said central spacer member, an outer plate positioned over each rubber-like packing member, projections on each of said outer plates extending away from the surface thereof so as to engage one of said packing members, and means for securing said outer plates in position to hold the packing members clamped between the spacer member and the outer plates.

9. In or for a differential fluid pressure motor of the oscillating paddle type, a paddle member comprising a central spacer member, a shaft carried by said central spacer member, a packing member of rubber-like material arranged on either side of said central spacer member, an outer plate positioned over each rubber-like packing member, projections on each of said outer plates on the surface thereof which engages one of said packing members constituted by tongues struck out from the material of the outer plates and projecting into the material of the packing members at least in the region of said shaft and means for securing said outer plates in position to hold the packing members clamped between the spacer member and the outer plates.

References Cited in the file of this patent

UNITED STATES PATENTS

| | | |
|---|---|---|
| 1,565,493 | Oishei et al. | Dec. 15, 1925 |
| 1,569,429 | Lippert | Jan. 12, 1926 |
| 2,612,875 | O'Shei | Oct. 7, 1952 |